(12) United States Patent
Asano et al.

(10) Patent No.: US 7,074,455 B2
(45) Date of Patent: Jul. 11, 2006

(54) METHOD OF MANUFACTURING POROUS METAL PLATES AND ELECTRODES FOR ALKALINE STORAGE BATTERIES

(75) Inventors: Gota Asano, Kanagawa (JP); Hitoshi Mikuriya, Kanagawa (JP); Kiyoto Watanabe, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 331 days.

(21) Appl. No.: 10/627,822

(22) Filed: Jul. 28, 2003

(65) Prior Publication Data

US 2004/0060156 A1    Apr. 1, 2004

(30) Foreign Application Priority Data

| Aug. 1, 2002 | (JP) | ............................ 2002-224564 |
| Aug. 7, 2002 | (JP) | ............................ 2002-229764 |
| Aug. 8, 2002 | (JP) | ............................ 2002-231403 |

(51) Int. Cl.
| B05D 5/12 | (2006.01) |
| B05D 3/12 | (2006.01) |
| B05D 3/02 | (2006.01) |
| H01M 4/88 | (2006.01) |
| C25D 5/54 | (2006.01) |

(52) U.S. Cl. .................... 427/115; 427/372.2; 427/359; 427/366; 502/101; 205/161; 205/164; 205/224

(58) Field of Classification Search .................. 427/58, 427/115, 372.2, 359, 366; 502/101; 205/159, 205/161, 164–169, 224, 227
See application file for complete search history.

(56) References Cited

U.S. PATENT DOCUMENTS

| 4,251,603 A | * | 2/1981 | Matsumoto et al. .......... 429/94 |
| 5,655,295 A | * | 8/1997 | Sugikawa ..................... 29/879 |
| 6,485,865 B1 | * | 11/2002 | Sugikawa ................... 429/235 |
| 6,558,848 B1 | * | 5/2003 | Kobayashi et al. .......... 429/241 |

FOREIGN PATENT DOCUMENTS

| JP | 58-161251 | * | 9/1983 |
| JP | 62-147657 | * | 7/1987 |
| JP | 3-226969 |   | 10/1991 |
| JP | 03-226969 | * | 10/1991 |
| JP | 08-222229 | * | 8/1996 |

* cited by examiner

*Primary Examiner*—Brian K. Talbot
(74) *Attorney, Agent, or Firm*—Wenderoth, Lind & Ponack, L.L.P.

(57) ABSTRACT

A method of manufacturing an electrode for an alkaline storage battery, including a process of manufacturing a porous metal plate. A method of manufacturing this porous metal plate includes adding a predetermined organic substance to a urethane sponge or coating a foamed urethane sponge with polyethylene terephthalate. Furthermore, the method includes grinding the urethane sponge or rolling the urethane sponge using a roll press.

16 Claims, 3 Drawing Sheets

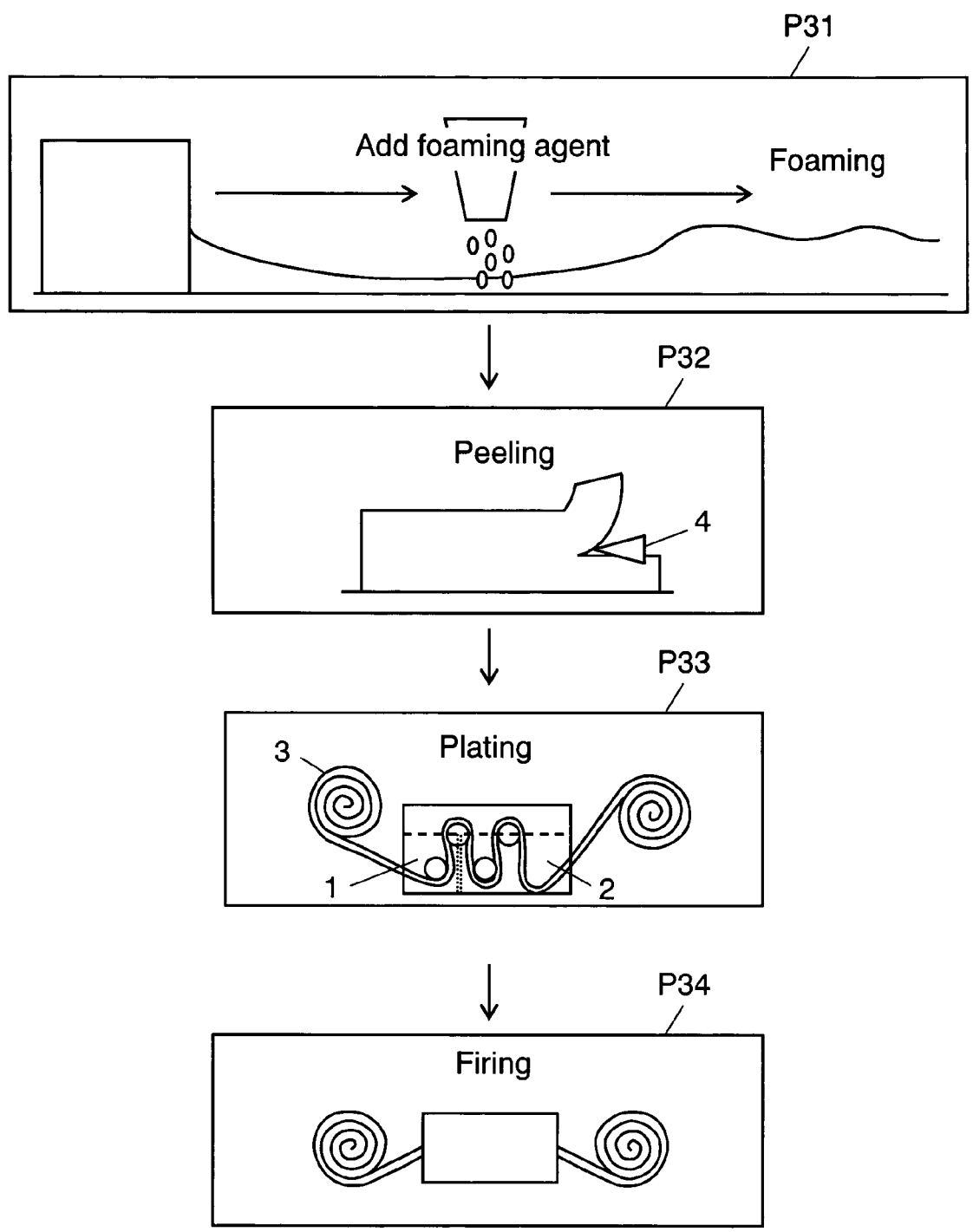

METHOD OF MANUFACTURING POROUS METAL PLATES AND ELECTRODES FOR ALKALINE STORAGE BATTERIES

BACKGROUND OF THE INVENTION

1. Field of the Invention

The present invention relates to methods of manufacturing alkaline storage batteries, and more particularly to methods of manufacturing superior porous metal plates for positive electrodes.

2. Background Art

With the increasing trend for equipment to be portable and cordless, the need for small and light secondary batteries with high energy density for use as power sources for this type of equipment has grown. There is thus a strong and growing demand for inexpensive secondary batteries with high capacity. Accordingly, there is downward pressure on prices of alkaline storage batteries, typically nickel-hydrogen storage batteries and nickel-cadmium storage batteries, combined with calls for improved reliability.

The steps of manufacturing conventional alkaline storage batteries are described next. First, an electrically insulated separator is interposed between the positive and negative plates, mainly using nickel hydroxide as an active material, to create a laminated member. This laminated member is wound spirally to create an electrode plate group. Then, the electrode plate group is housed in a metal battery case, and alkaline electrolyte solution is filled to a predetermined level. Lastly, the top of the battery case is sealed by a top cap which also acts as a positive or negative terminal.

The steps of manufacturing a conventional positive plate are described next. Active paste is made by mixing the active material mainly made of nickel hydroxide, water, and water-soluble binder. This active paste is impregnated in a porous nickel plate, and then dried. After drying, the porous nickel plate is pressed by passing it between small rollers to make the plate thickness uniform and enhance the density of the impregnated active material. Cracking inevitably occurs during winding in some of conventionally manufactured positive plates, with the risk of cracking rising as the battery capacity becomes greater.

To enable the battery to discharge a high current, the area of facing positive and negative plates need to be made as broad as possible during winding. But the broadening of the area causes increase of the volume of the core member. The Japanese Laid-open Patent No. H3-226969 shows how to suppress cracking which may occur while winding positive and negative plates, where a method of peeling is adopted in which the twisting direction of electrode plates becomes perpendicular to the deflating direction of pores during foaming.

The positive plate using a conventional material is compressed on an inner periphery, that is, to the winding core, but expanded on the outer periphery. This is the main cause of cracking on the outer periphery. In particular, batteries with high electrical capacity have insufficient flexibility, increasing the risk of causing cracking. A cracked portion as occurred above penetrates through the separator, contacts the negative plate, and causes internal short-circuiting.

Moreover, foamed urethane, which is the base material for the porous positive plate, cannot be made thinner than 1 mm due to the performance limitations of current foam cutting machines and peeling machines. Accordingly, a core member having a two-dimensional structure such as a punch metal is required to be used in order to achieve a core thickness below 1 mm.

If the active material is applied to this two-dimensional core member, a conductive net with the active material is not sufficiently established, causing difficulty in drawing out the required battery characteristics.

Furthermore, if a porous metal plate of 1 mm or thicker is rolled for thinning, the skeleton is broken, pores on the surface are blocked, or impregnation of mixed paste of active material is deteriorated in some cases.

SUMMARY OF THE INVENTION

An object of the present invention is to eliminate the above disadvantages, and offer an electrode for high-capacity and high-power alkaline storage batteries, and a battery using this electrode. In particular, the present invention avoids the cost increase that would otherwise occur due to increased core member volume, and also prevents a reduction of the occupied volume of active material, due to increased core member volume in the electrode, which would result in less battery capacity.

To achieve the above object, a method of manufacturing the electrode for alkaline storage batteries of the present invention includes a process of manufacturing a porous metal plate. In this process, an organic substance other than urethane is mixed in urethane sponge (foamed urethane), or urethane sponge is coated with polyethylene terephthalate before plating the urethane sponge.

Another method of manufacturing the porous metal plate for alkaline storage batteries includes the step of grinding the urethane sponge or the step of rolling the urethane sponge between a pair of roller presses in which at least the top or bottom roller is heated.

Mixed paste of active material mainly consisting of nickel hydroxide and water is impregnated in the porous metal plate manufactured through the above steps, and dried to manufacture the electrode of the present invention for alkaline storage batteries.

BRIEF DESCRIPTION OF THE DRAWINGS

FIG. 3 is a schematic view of a conventional method of manufacturing a porous metal plate for alkaline storage batteries.

DETAILED DESCRIPTION OF THE INVENTION

FIRST EMBODIMENT

Figure 1:
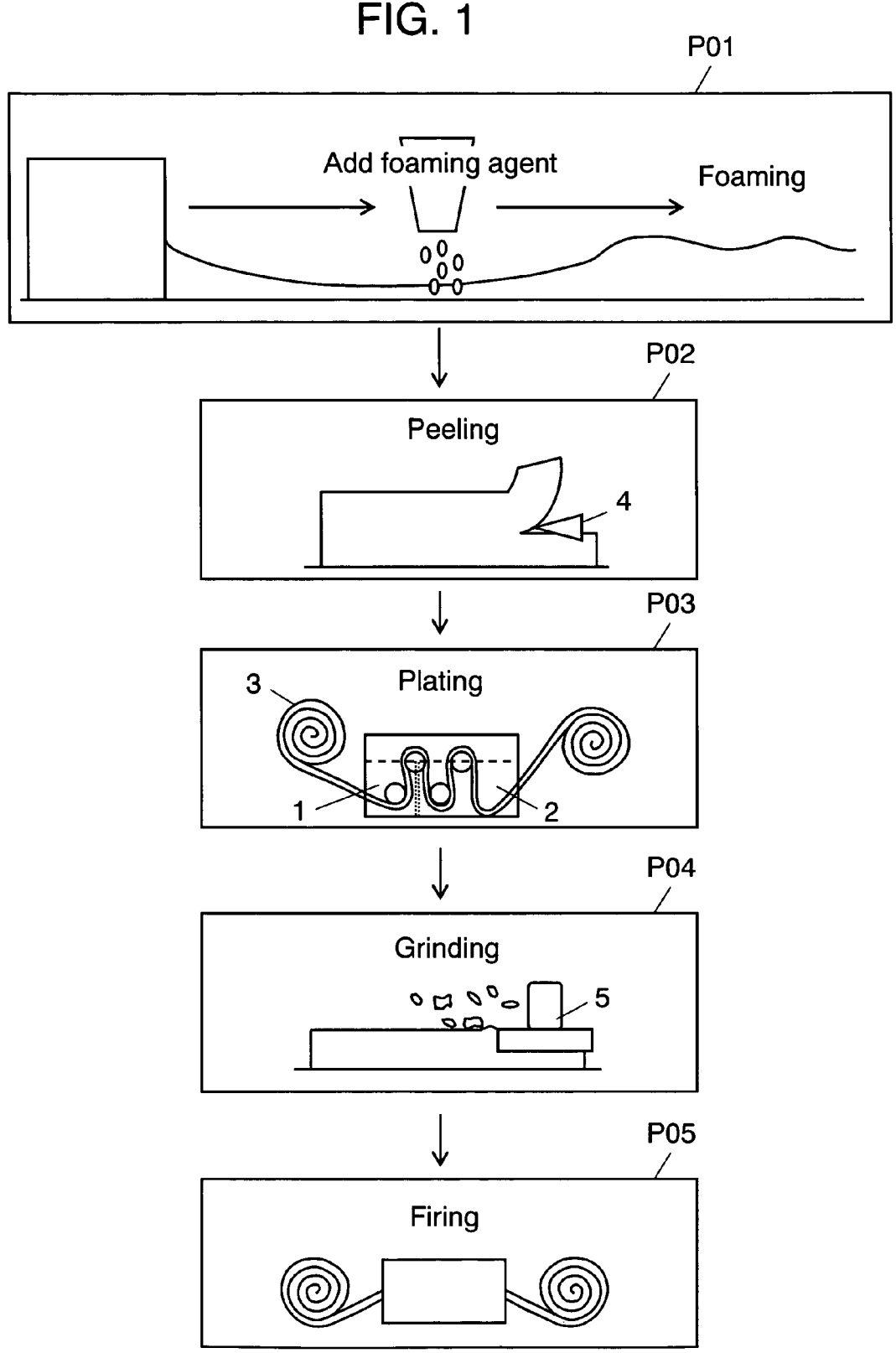
FIG. 1 is a schematic view of a method of manufacturing a porous metal plate of the present invention for alkaline storage batteries

A method of manufacturing a porous metal plate of the present invention for alkaline storage batteries includes the steps of: foaming urethane resin composition to make urethane sponge, coating the urethane sponge with polyethylene terephthalate, plating the urethane sponge with nickel, and firing the urethane sponge to remove organic materials.

Polyethylene terephthalate is preferably coated such that it accounts for 50 to 100% of the skeleton thickness of the urethane sponge. 'Skeleton' refers to the urethane resin surrounding each pore in the urethane sponge. 'Skeleton thickness' refers to the sectional area of the urethane resin perpendicular to the thickness direction of the urethane sponge. Accordingly, a thicker skeleton has larger sectional area of urethane resin, and contrarily, a smaller sectional area of pores. In other words, the proportion of the sectional area of urethane resin is large when the skeleton of the urethane sponge is thick.

The porous metal plate in the first exemplary embodiment is made of a foamed nickel matrix in which pores are connected three-dimensionally.

The thickness of the porous metal plate is preferably 0.2 to 0.8 mm.

Another method of manufacturing the porous metal plate in the first exemplary embodiment includes the step of mixing at least one of glycerin, polyethersulfone, and organopolysiloxane into the urethane sponge. Also in this case, the skeleton of the urethane sponge is thickened, and accordingly the volume ratio of the urethane resin becomes larger.

In the method of manufacturing an alkaline storage battery electrode in the first exemplary embodiment, an active material mainly consisting of nickel hydroxide is impregnated in the porous nickel plate manufactured using the method described above, after which the plate is dried.

The porous metal plate manufactured using the method in the first exemplary embodiment allows the use of the porous metal plate which is much thinner than a conventional porous metal plate. This enables the manufacture of electrodes whose nickel density is even lower than in the prior art. More specifically, the core member volume can be reduced to half from the conventional 400 g/m$^2$ to 200 g/m$^2$. As a result, no cost increase results, even if the length of the electrode plate is made longer than in the prior art.

The following two disadvantages are suppressed by making an electrode plate group by spirally winding the positive plate described in the first exemplary embodiment, a negative plate, and a separator:

(1) Cracking mainly on the outer periphery of the positive plate during winding; and (2) Internal short-circuiting caused by any burrs on the cut edge of the electrode plate penetrating the separator and contacting the negative plate.

The positive plate made of the porous metal plate of the present invention contributes to progress in increasing the capacity and power of alkaline storage batteries. The output characteristic improves with increased area of the positive plate and negative plate facing each other in the winding direction.

The first exemplary embodiment of the present invention is detailed with reference to examples below.

EXAMPLE 1

The urethane sponge is made by adding a foaming agent to a solution of urethane resin composition. The urethane sponge sheet made is 1.6 mm thick having 55 consecutive pores per square inch.

Next, this urethane sponge sheet is immersed in a polyethylene terephthalate solution to coat the entire face, including inside the pores, of the urethane sponge sheet with polyethylene terephthalate. The coating thickness of polyethylene terephthalate is maintained at about 75% of the thickness of the urethane sponge skeleton.

This urethane sponge sheet is immersed in a palladium chloride solution as pretreatment, and electroless plating is applied to the urethane sponge sheet in a nickel-plating solution.

This urethane sponge sheet is then fired at 1000° C. in hydrogen gas to decompose and remove the organic substances to complete a porous nickel plate.

Active material paste is made in the following way. First, nickel hydroxide and carboxyl methyl cellulose as a binder are added in a weight ratio of 100:0.2. Then, water is added to 25 wt % of the entire paste, and these materials are mixed to create the active material paste.

This active material paste is impregnated in the above porous nickel plate and dried, and is then pressed to increase the impregnation density to create a positive plate of width 35 mm, thickness 0.4 mm, and length 390 mm.

A separator is interposed as electrical insulation between this positive plate and a negative plate of width 35 mm, thickness 0.2 mm, and length 495 mm; and these are spirally wound to create the electrode plate group. The negative plate is made by applying hydrogen-storing alloy powder to the core member made of punch metal. The electrode plate group is housed in a battery case of nickel-plated iron. After injecting the alkaline electrolytic solution, the top of the battery case is sealed with a top cap which acts as a positive electrode terminal to complete a first nickel-hydrogen storage battery. This first storage battery has a nominal capacity of 3000 mAh in the size HR26/47.

EXAMPLE 2

Polyethersulfone resin particles are added to the urethane resin solution at the volume ratio of 20:100. Next, the foaming agent is added to this mixed solution for foaming and making urethane sponge 1.6 mm thick having 55 consecutive pores per square inch. This urethane sponge is then immersed in the palladium chloride solution as pretreatment, and electroless plating is applied to the urethane sponge in the nickel-plating solution. The urethane sponge after nickel plating is fired at 1000° C. in hydrogen gas to complete the porous nickel plate.

Active material paste is made in the following way. First, nickel hydroxide and carboxyl methyl cellulose as the binder are added in a weight ratio of 100:0.2. Then, water is added to 25 wt % of the entire paste. These materials are mixed to create the active material paste.

This active material paste is impregnated in the above porous nickel plate and dried, and is then pressed to increase the impregnation density to create a positive plate of width 35 mm, thickness 0.4 mm, and length 390 mm.

A separator is interposed as electrical insulation between this positive plate and a negative plate of width 35 mm, thickness 0.4 mm, and length 330 mm; and these are spirally wound to create the electrode plate group. The negative plate is made by applying hydrogen-storing alloy powder to the core member made of punch metal. The electrode plate group is housed in a battery case of nickel-plated iron. After injecting the alkaline electrolytic solution, the top of the battery case is sealed with the top cap which acts as the positive electrode terminal to complete a second nickel-hydrogen storage battery. This second storage battery has a nominal capacity of 3000 mAh in the size HR26/47.

(Comparison 1)

Next, the urethane sponge 1.6 mm thick having 55 consecutive pores per square inch is immersed in the palladium chloride solution as pretreatment, and is then plated in the nickel-plating solution. After plating, this plated foamed-urethane resin is fired at 1000° C. in hydrogen gas to complete the porous nickel plate.

Active material paste is made in the following way. First, nickel hydroxide and carboxyl methyl cellulose as the binder are added in a weight ratio of 100:0.2. Then, water is added to 25 wt % of the entire paste. These materials are mixed to create the active material paste. This active material paste is impregnated in the above porous nickel plate and dried, and is then pressed to increase the impregnation density to create a positive plate of width 43.7 mm, thickness 0.8 mm, and length 75 mm.

A separator is interposed as electrical insulation between this positive plate and a negative plate of width 43.7 mm, thickness 0.4 mm, and length 107 mm; and these are spirally wound to create the electrode plate group. The negative plate is made by applying hydrogen-storing alloy powder to the core member made of punch metal. The electrode plate group is housed in a battery case of nickel-plated iron. After injecting the alkaline electrolytic solution, the top of the battery case is sealed with the top cap which acts as the positive electrode terminal to complete a third nickel-hydrogen storage battery. This storage battery has a nominal capacity of 3000 mAh in the size HR26/47.

Then, 10,000 each of the first, second and third batteries are made.

To confirm the leak resistance of the positive plate of Examples 1 and 2 and Comparison 1, the voltage of each of the first, second, and third batteries is measured after initial discharge and charge. As judgment criteria for a voltage test, batteries having a terminal voltage between 1.20 and 1.35 V are regarded as non-defective.

All 10,000 of each of the first and second batteries in the first exemplary embodiment are found to have a voltage between 1.25 and 1.28 V, thus demonstrating stable characteristics. Conversely, of the 10,000 third batteries 130 in Comparison 1, six are found to have a voltage below 1.20 V, of which one battery was between 0.00 and 0.10 V.

Investigations made by taking apart the third batteries with defective voltage reveal the occurrence of cracking on the outer periphery of the positive plate or edge burr. This cracked or burred portion has penetrated through the separator and made contact with the negative plate, causing internal short-circuiting.

In this Comparison 1, the positive plate is compressed on the inner periphery to the winding core and expanded on the outer periphery when the positive plate is wound. Cracking occurs when the outer periphery of the positive plate expands due to insufficient flexibility of the positive plate. The cut burr at the edge occurs because the cutting teeth are usually difficult to enter in the thickness direction, and thus often the material is cut as the edge extends. In particular, since the cut skeleton is exposed randomly on the edge when a porous metal plate is used, a thicker plate is more likely to generate burrs. Accordingly, if the electrode plate can be made thinner, as in the first exemplary embodiment, the cutting teeth can enter uniformly, resulting in a smooth edge. Consequently, burrs are unlikely to occur.

SECOND EMBODIMENT

Major steps in a method of manufacturing the porous metal plate in a second exemplary embodiment are described with reference to FIG. 1.

The method of manufacturing the porous metal plate of the present invention includes:

(a) foaming urethane resin composition to make urethane sponge (Step P01);

(b) peeling the urethane sponge (Step P02);

(c) plating the urethane sponge with nickel (Step P03);

(d) grinding the urethane sponge (Step P04); and (e) firing the urethane sponge to remove it (Step P05).

Furthermore, (f) mixed paste of active material mainly consisting of nickel hydroxide and water is impregnated in the porous nickel plate manufactured using the method described above, after which the plate is dried to complete an alkaline storage battery electrode in the second exemplary embodiment.

The thickness of the urethane sponge is preferably made to be 1.4 to 2.0 mm in the above peeling step, and 0.5 to 1.0 mm in the grinding step. The thickness of the porous metal plate is preferably 0.2 to 0.8 mm.

It is also preferable to cure or cross-link the urethane resin composition before foaming it in order to facilitate peeling and grinding. To cure the urethane resin composition, it is preferable to mix 2 to 4 parts by weight of epoxy resin to 15 parts by weight of urethane resin so as to achieve a preferable degree of curing.

The sequence of Step P03 of plating and Step P04 of grinding can be reversed.

In Step P03, that of plating the urethane sponge with nickel, the urethane sponge is first immersed in metal catalyst solution and then the current is applied in the nickel solution.

In Step P02, that of peeling the urethane sponge, peeling is implemented by the foam cutting machine, which is a polyurethane processing machine, while the pore shape is sustained in the urethane sponge.

The above present invention has the following advantages over the conventional porous metal plate.

(1) An extremely thin porous metal plate can be made.

(2) The porous metal plate can survive the tension applied in the length direction when impregnating the active material paste.

(3) Production of electrodes is feasible even if the nickel density is below that in the prior art.

Accordingly, the core member volume can be reduced to half from the conventional 400 g/m$^2$ to 200 g/m$^2$. The length of the electrode plate can thus be made longer for a reduced volume of the core member without increasing the cost.

The use of the positive plate made using the method in the second exemplary embodiment for the alkaline storage battery achieves the following advantageous effects compared to the use of the positive plate made using the conventional manufacturing method: (1) Reduces the occurrence of cracking which may occur mainly on the outer periphery of the positive plate during winding; and (2) Reduces burrs which may occur at the cut edge of the positive plate. These effects significantly reduce the phenomenon of internal short-circuiting caused by the cracked positive plate or burr penetrating through the separator and contacting the negative electrode.

In general, the output characteristic improves with increased area of the positive plate and negative plate facing each other in the winding direction. Accordingly, the positive plate made of the above porous metal plate using the urethane sponge contributes to progress in increasing the capacity and power.

The second exemplary embodiment of the present invention is detailed with reference to examples below.

EXAMPLE 3

Urethane sponge 1.6 mm thick having 55 consecutive pores per square inch is ground to 0.8 mm thick using a grinder. The ground foamed-urethane is immersed in the palladium chloride solution as pretreatment, and then electroplated in the nickel-plating solution. Nickel plating is applied such that the plating weight is 200 g/m$^2$ to the urethane sponge. This plated foamed-urethane is fired at 1000° C. in hydrogen gas to complete a porous nickel plate.

Active material paste is made in the following way. First, nickel hydroxide and carboxyl methyl cellulose as the binder are added in a weight ratio of 100:0.2. Then, water is added to 25 wt % of the entire paste. These materials are mixed to create the active material paste.

This active material paste is impregnated in the above porous nickel plate and dried, and is then pressed to increase the impregnation density to create a positive plate of width 43.7 mm, thickness 0.2 mm, and length 143 mm in Example 3.

A separator is interposed as electrical insulation between this positive plate and a negative plate of width 43.7 mm, thickness 0.2 mm, and length 204 mm; and these are spirally wound to create the electrode plate group. The negative plate is made by applying hydrogen-storing alloy powder to the core member made of punch metal. The electrode plate group is housed in a battery case of nickel-plated iron. After injecting the alkaline electrolytic solution, the top of the battery case is sealed with a top cap which acts as a positive electrode terminal to complete a fourth nickel-hydrogen storage battery 210. This storage battery 210 has a nominal capacity of 2000 mAh in the size AA.

EXAMPLE 4

Urethane sponge 1.6 mm thick having 55 consecutive pores per square inch is immersed in the palladium chloride solution as pretreatment, and electroplated in nickel-plating solution such that the plating weight is 600 g/m². This plated foamed-urethane is ground to 0.8 mm thick and 300 g/m² density using a grinder. After grinding, the urethane sponge is fired at 1000° C. in hydrogen gas to complete a porous nickel plate.

Active material paste is made in the following way. First, nickel hydroxide and carboxyl methyl cellulose as the binder are added in a weight ratio of 100:0.2. Then, water is added to 25 wt % of the entire paste. These materials are mixed to create the active material paste.

This active material paste is impregnated in the above porous nickel plate and dried, and is then pressed to increase the impregnation density to create a positive plate of width 43.7 mm, thickness 0.3 mm, and length 113 mm.

A separator is interposed as electrical insulation between this positive plate and a negative plate of width 43.7 mm, thickness 0.2 mm, and length 204 mm; and these are spirally wound to create the electrode plate group. The negative plate is made by applying hydrogen-storing alloy powder to the core member made of punch metal. The electrode plate group is housed in a battery case of nickel-plated iron. After injecting the alkaline electrolytic solution, the top of the battery case is sealed with the top cap which acts as the positive electrode terminal to complete a fifth nickel-hydrogen storage battery 220. This storage battery 220 has a nominal capacity of 2000 mAh in the size AA.

(Comparison 2)

A conventional method of manufacturing a porous metal plate in Comparison 2 shown in FIG. 3 is described next. Comparison 2 includes Step P31 of foaming urethane resin composition to make urethane sponge, Step P32 of peeling the urethane sponge, Step P33 of nickel-plating the urethane sponge, and Step P34 of firing the urethane sponge to remove urethane resin.

Urethane sponge 1.6 mm thick having 55 consecutive pores per square inch is made according to the above manufacturing steps. This urethane sponge is immersed in the palladium chloride solution as pretreatment, and then electroplated in the nickel-plating solution. This urethane sponge is then fired at 1000° C. in hydrogen gas to complete a porous nickel plate.

Active material paste is made in the following way. First, nickel hydroxide and carboxyl methyl cellulose as the binder are added in a weight ratio of 100:0.2. Then, water is added to 25 wt % of the entire paste. These materials are mixed to create the active material paste.

This active material paste is impregnated in the above porous nickel plate and dried, and is then pressed to increase the impregnation density to create a positive plate of width 43.7 mm, thickness 0.8 mm, and length 75 mm.

A separator is interposed as electrical insulation between this positive plate and a negative plate of width 43.7 mm, thickness 0.4 mm, and length 107 mm; and these are spirally wound to create the electrode plate group. The negative plate is made by applying hydrogen-storing alloy powder to the core member made of punch metal. The electrode plate group is housed in a battery case of nickel-plated iron. After injecting the alkaline electrolytic solution, the top of the battery case is sealed with a top cap which acts as the positive electrode terminal to complete a sixth nickel-hydrogen storage battery 230. This storage battery 230 has a nominal capacity of 2000 mAh in the size AA.

Next, 10,000 each of the above batteries 210, 220, and 230 are made.

The internal short-circuiting between the positive plate in the second exemplary embodiment and the negative plate, and the positive plate in the prior art and the negative plate is tested.

After the initial discharge and charge of batteries 210, 220, and 230 respectively, the batteries are left at 20° C. for 24 hours. Then, the voltage of 10,000 each of the batteries 210, 220, and 230 is measured. As judgment criteria for the test, batteries having a terminal voltage between 1.20 and 1.35 V are regarded as non-defective. All 10,000 of the batteries 210 and 220 in the second exemplary embodiment are found to have a voltage between 1.25 and 1.28 V. Conversely, five of the batteries 230 in Comparison 2 are found to have a voltage below the reference voltage 1.20 V, of which one battery has a voltage of 0.10 V.

Investigations made by taking apart the batteries 230 in Comparison 2 with defective voltage reveal the occurrence of cracking or edge burr. This cracked or burred portion has penetrated through the separator and made contact with the negative plate, causing internal short-circuiting.

In this Comparison 2, the positive plate is compressed on the inner periphery of the winding core and expanded on the outer periphery when the positive plate is wound. Cracking occurs when the outer periphery of the positive plate expands due to insufficient flexibility of the positive plate. The cut burr at the edge occurs because the cutting teeth are usually difficult to enter in the thickness direction, and thus often the material is cut as the edge extends. In particular, since the cut skeleton is exposed randomly on the edge when a porous metal plate is used, a thicker plate is more likely to generate burrs. Accordingly, if the electrode plate can be made thinner, as in the second exemplary embodiment, the cutting teeth can enter uniformly, resulting in a smooth edge. Consequently, burrs are unlikely to occur.

Figure 2:
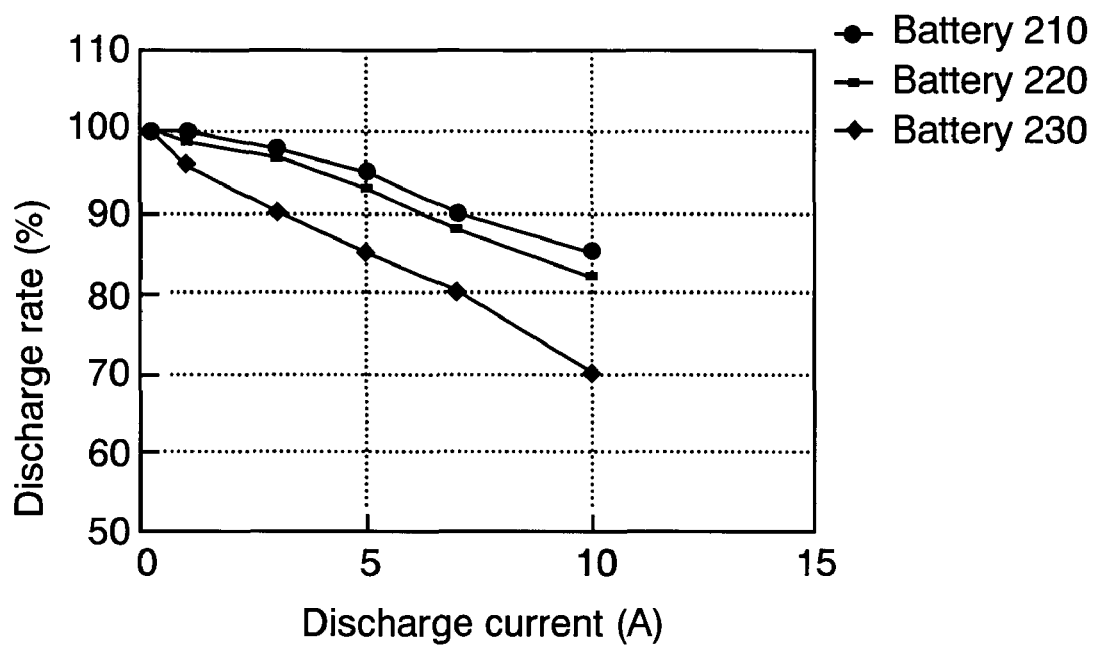
FIG. 2 is a chart comparing discharge characteristics of batteries in Examples of the present invention and the prior art.

The discharge characteristic of batteries 210, 220, and 230 are shown in FIG. 2.

In FIG. 2, the X axis is the discharge current in ampere (A), and the Y axis is discharge rate (%). The discharge rate is 100% when discharge current is 0.2 A. The discharge rate up to a current of 10 A is measured. The results are shown in FIG. 2. It is apparent from FIG. 2 that storage battery 210 manufactured in Example 3 and storage battery 220 manufactured in Example 4 both show significant improvement in reduction of discharge rate at large currents compared to storage battery 230 manufactured in Comparison 2. Accordingly, it is apparent that the discharge characteristic at large currents is enhanced when the area of positive plate and negative plate facing each other is larger.

Even if the facing area is small, the discharge rate characteristic can be maintained at almost the same level by increasing the weight of nickel plating per unit area of the porous metal plate.

It is also found that battery 210 described in Example 3 shows less increase in internal pressure during charging, which is evidence that there is more allowance for the volume of components other than the electrode plate group in the battery case. Accordingly, for example, the positive plate containing more active material than that of the prior art can be used for further increasing the capacity of battery 210.

THIRD EMBODIMENT

A method of manufacturing the porous metal plate in a third exemplary embodiment includes the following steps:

(a) peeling urethane sponge;

(b) rolling the urethane sponge using a pair of roll presses whose top or bottom roller is at least heated;

(c) nickel-plating the urethane sponge; and (d) firing the urethane sponge to remove urethane resin.

The sequence of step (b) of rolling and step (c) of plating can be reversed.

The thickness of urethane sponge in the peeling step is preferably 1.4 to 2.0 mm, and the thickness of the urethane sponge in the step of rolling using the roll press is preferably 0.5 mm to 1.0 mm.

The thickness of the above porous nickel plate is preferably 0.2 mm to 0.8 mm.

With respect to the roll press, the top and bottom rollers are heated between 200 and 400° C. so as to manufacture a uniform porous metal plate without uneven pores.

Alternatively, only one of the top and bottom rollers of the roll press is heated to between 200 and 400° C. Rolling under this condition creates dense pores on one face of the porous metal plate contacting the heated roller, and relatively larger pores on the other face contacting the unheated roller.

Active material is impregnated in the plate as processed above to make the electrode. The face with a dense skeleton in the manufactured plate is placed outward, and the electrode is wound spirally. This is more likely than in the prior art to prevent cracks developing on the electrode during winding. Dense pores mean a low void rate on the porous nickel plate, and rough pores mean a high void rate.

The method of manufacturing the electrode for the alkaline storage battery in the third exemplary embodiment includes the step of manufacturing the aforementioned porous metal plate and the step of impregnating mixed paste of active material mainly consisting of nickel hydride and water in the plate and drying it.

The electrode for the alkaline storage battery described in the third exemplary embodiment is characterized by rolling the urethane sponge, using a heated roll press, to a predetermined thickness while preserving the foam skeleton of the urethane sponge.

This method enables the use of an extremely thin porous metal plate compared to the conventional porous metal plate. As a result, the plate survives the tension applied in the length direction when impregnating the active material mixed paste. Production of electrodes is thus made feasible even if the nickel density is lower than the prior art.

Accordingly, the core member volume can be reduced from the 400 $g/m^2$ used in the prior art to 200 $g/m^2$. The length of the electrode plate can thus be made longer for a reduced volume of the core member without increasing the cost. This positive plate, the negative plate, and separator are combined and wound spirally to create the electrode plate group. During winding, the occurrence of cracking which may occur mainly on the outer periphery of the positive plate and burrs which may occur at the cut edge of the positive plate can be suppressed. Accordingly, the phenomenon of internal short-circuiting caused by the cracked positive electrode or burr penetrating through the separator and contacting the negative electrode can be significantly reduced.

In general, the output characteristic improves as the area of the positive plate and negative plate facing each other in the winding direction increase. Accordingly, the positive plate manufactured using the above porous metal plate of the urethane sponge contributes significantly to higher capacity and power.

The third exemplary embodiment is detailed with reference to examples below.

EXAMPLE 5

The top and bottom rollers of the roll press, consisting of a pair of top and bottom rollers, are heated to 250° C. Urethane sponge 1.6 mm thick having 55 consecutive pores per square inch is rolled to a thickness of 0.8 mm by sandwiching urethane sponge by the top and bottom rollers. Rolled urethane sponge is immersed in the palladium chloride solution as pretreatment, and then electroplated in the nickel-plating solution. Plating volume is 200 $g/m^2$. Then, plated foamed-urethane is fired at 1000° C. in hydrogen gas to decompose and remove organic substances to complete a porous nickel plate.

Active material paste is made in the following way. First, nickel hydroxide and carboxyl methyl cellulose as the binder are added in a weight ratio of 100:0.2. Then, water is added to 25 wt % of the entire paste. These materials are mixed to create the active material paste.

This active material paste is impregnated in the above porous nickel plate and dried, and is then pressed to increase the impregnation density and create a positive plate of width 43.7 mm, thickness 0.2 mm, and length 143 mm.

A separator is interposed as electrical insulation between this positive plate and a negative plate of width 43.7 mm, thickness 0.2 mm, and length 204 mm; and these are spirally wound to create the electrode plate group. The negative plate is made by applying hydrogen-storing alloy powder to the core member made of punch metal. The electrode plate group is housed in a battery case of nickel-plated iron. After injecting the alkaline electrolytic solution, the top of the battery case is sealed with a top cap which acts as a positive electrode terminal to complete a seventh nickel-hydrogen storage battery. This seventh storage battery has a nominal capacity of 2000 mAh in the size AA.

EXAMPLE 6

The top and bottom rollers of the roll press, consisting of a pair of top and bottom rollers, are heated to 350° C. Urethane sponge 1.6 mm thick having 55 consecutive pores per square inch is immersed in the palladium chloride solution as pretreatment. This urethane sponge is then electroplated in the nickel-plating solution. The plating volume is 600 g/m².

Plated foamed-urethane is sandwiched by the top and bottom rollers of the roll press and the plated urethane sponge is rolled to a thickness of 0.8 mm and density of 300 g/m². This is fired at 1000° C. in hydrogen gas to complete a porous nickel plate.

Active material paste is made in the following way. First, nickel hydroxide and carboxyl methyl cellulose as the binder are added in a weight ratio of 100:0.2. Then, water is added to 25 wt % of the entire paste. These materials are mixed to create the active material paste.

This active material paste is impregnated in the above porous nickel plate and dried, and is then pressed to increase the impregnation density to create a positive plate of width 43.7 mm, thickness 0.3 mm, and length 113 mm.

A separator is interposed as electrical insulation between this positive plate and a negative plate of width 43.7 mm, thickness 0.2 mm, and length 204 mm; and these are spirally wound to create the electrode plate group. The negative plate is made by applying hydrogen-storing alloy powder to the core member made of punch metal. The electrode plate group is housed in a battery case of nickel-plated iron. After injecting the alkaline electrolytic solution, the top of the battery case is sealed with a top cap which acts as a positive electrode terminal to complete an eighth nickel-hydrogen storage battery. This eighth storage battery made has a nominal capacity of 2000 mAh in the size AA.

(Comparison 3)

Urethane sponge 1.6 mm thick having 55 consecutive pores per square inch is immersed in the palladium chloride solution as pretreatment. This urethane sponge is then electroplated in the nickel-plating solution. The plated urethane sponge is fired at 1000° C. in hydrogen gas to complete a porous nickel plate.

Active material paste is made in the following way. First, nickel hydroxide and carboxyl methyl cellulose as the binder are added in a weight ratio of 100:0.2. Then, water is added to 25 wt % of the entire paste. This active material paste is impregnated and dried, and is then pressed to increase the impregnation density to create a positive plate of width 43.7 mm, thickness 0.8 mm, and length 75 mm.

A separator is interposed as electrical insulation between this positive plate and a negative plate of width 43.7 mm, thickness 0.4 mm, and length 107 mm; and these are spirally wound to create the electrode plate group. The negative plate is made by applying hydrogen-storing alloy powder to the core member made of punch metal. The electrode plate group is housed in a battery case of nickel-plated iron. After injecting the alkaline electrolytic solution, the top of the battery case is sealed with a top cap which acts as a positive electrode terminal to complete a ninth nickel-hydrogen storage battery. This ninth storage battery has a nominal capacity of 2000 mAh in the size AA.

Then, 10,000 each of the seventh, eighth, and ninth batteries are manufactured.

The leak resistance of the seventh and eighth batteries in Examples 5 and 6 and the ninth battery in Comparison 3 is tested. After the initial discharge and charge of the seventh, eighth, and ninth batteries, the voltage of 10,000 each of the seventh, eighth, and ninth batteries is measured. As the judgment criteria for the test, batteries with a terminal voltage between 1.20 and 1.35 V are regarded as non-defective.

All 10,000 of each of the seventh and eighth batteries in the third exemplary embodiment are found to have a voltage between 1.25 and 1.28V. Conversely, six of the ninth batteries in Comparison 3 are found to have a voltage below 1.20 V, of which one between 0.00 and 0.10 V.

Investigations made by taking apart the ninth batteries in Comparison 3 with defective voltage reveal the occurrence of cracking on the outer periphery of the positive plate. This cracked or burred portion has penetrated through the separator and made contact with the negative plate, causing internal short-circuiting. This difference in quality is caused for the same reason as described in the second exemplary embodiment.

As described above, the electrode of the present invention for alkaline storage batteries uses the porous metal plate for alkaline storage batteries manufactured using the method of the present invention. This prevents cracking on the positive plate during winding and also suppresses the occurrence of burrs at the edge.

Furthermore, the use of the porous metal plate of the present invention as the positive plate allows the manufacture of high capacity and high power alkaline storage batteries at low cost.

What is claimed is:

1. A method of manufacturing an electrode for an alkaline storage battery, said method including a process of manufacturing a porous substrate, said process comprising:
    making a urethane sponge by foaming a urethane resin composition;
    reducing a void rate of said urethane sponge;
    after said reducing of the void rate of said urethane sponge plating said urethane sponge with nickel to form nickel-plated urethane sponge; and
    firing said urethane sponge to obtain a porous metal plate by removing urethane sponge;
    wherein said reducing of the void rate of said urethane sponge comprises coating polyethylene terephthalate on said urethane sponge.

2. The method of claim 1, wherein said coating of said polyethylene terephthalate on said urethane sponge is carried out such that said polyethylene terephthalate accounts for 50 to 100% of a sectional area of said urethane resin of said urethane sponge perpendicular to a thickness direction of said urethane sponge.

3. The method of claim 1, wherein said porous metal plate is made to be 0.2 to 0.8 mm thick.

4. The method of claim 1, further comprising, after obtaining said porous metal plate, impregnating an active material in said porous metal plate and drying, said active material mainly consisting of nickel hydroxide.

5. A method of claim 1, further comprising:
    after said making of said urethane sponge, peeling said urethane sponge to form said urethane sponge in a first thickness by using a foam cutting machine; and
    after said peeling of said urethane sponge has been carried out or after both said peeling and said plating of said urethane sponge have been carried out, thinning said urethane sponge to form said urethane sponge in a second thickness that is thinner than said first thickness.

6. The method of claim 5, wherein said thinning of said urethane sponge comprises grinding said urethane sponge.

7. The method of claim 6, wherein said first thickness of said urethane sponge is 1.4 to 2.0 mm.

8. The method of claim 6, wherein said second thickness of said urethane sponge is 0.5 mm to 1.0 mm.

9. The method of claim 6, wherein a thickness of said porous metal plate is made to be 0.2 mm to 0.8 mm.

10. The method of claim 6, further comprising, after obtaining said porous metal plate, impregnating an active material in said porous metal plate and drying, said active material mainly consisting of nickel hydroxide.

11. The method of claim 5, wherein said thinning of said urethane sponge comprises rolling the urethane sponge using a roll press having top and bottom rollers, and at least one of said top and bottom rollers is heated.

12. The method of claim 11, wherein said first thickness of said urethane sponge is 1.4 to 2.0 mm.

13. The method of claim 11, wherein said second thickness of said urethane sponge is 0.5 to 1.0 mm.

14. The method of claim 11, wherein a thickness of said porous metal plate is made to be 0.2 to 0.8 mm.

15. The method of claim 11, wherein said at least one of the top and bottom rollers is heated to 200 to 400° C.

16. The method of claim 11, further comprising, after obtaining said porous metal plate, impregnating an active material in said porous metal plate and drying, said active material mainly consisting of nickel hydroxide.

* * * * *

UNITED STATES PATENT AND TRADEMARK OFFICE
CERTIFICATE OF CORRECTION

| | | |
|---|---|---|
| PATENT NO. | : 7,074,455 B2 | Page 1 of 1 |
| APPLICATION NO. | : 10/627822 | |
| DATED | : July 11, 2006 | |
| INVENTOR(S) | : Gota Asano et al. | |

It is certified that error appears in the above-identified patent and that said Letters Patent is hereby corrected as shown below:

Please insert

IN THE CLAIMS

In Claim 1 column 12, lines 29 and 30, please replace "urethane sponge plating" with --urethane sponge, plating--.

Signed and Sealed this

Twenty-sixth Day of December, 2006

JON W. DUDAS
*Director of the United States Patent and Trademark Office*